United States Patent
Shiraishi et al.

(10) Patent No.: US 8,927,104 B2
(45) Date of Patent: Jan. 6, 2015

(54) INDIUM TIN OXIDE POWDER, PRODUCTION METHOD THEREFOR, TRANSPARENT CONDUCTIVE COMPOSITION, AND INDIUM TIN HYDROXIDE

(75) Inventors: Shinya Shiraishi, Akita (JP); Megumi Narumi, Akita (JP)

(73) Assignees: Mitsubishi Materials Corporation, Tokyo (JP); Mitsubishi Materials Electronic Chemicals Co., Ltd., Akita-shi (JP)

( * ) Notice: Subject to any disclaimer, the term of this patent is extended or adjusted under 35 U.S.C. 154(b) by 0 days.

(21) Appl. No.: 13/811,710

(22) PCT Filed: Oct. 25, 2010

(86) PCT No.: PCT/JP2010/068872
§ 371 (c)(1),
(2), (4) Date: Jan. 23, 2013

(87) PCT Pub. No.: WO2012/014337
PCT Pub. Date: Feb. 2, 2012

(65) Prior Publication Data
US 2013/0122305 A1 May 16, 2013

(30) Foreign Application Priority Data
Jul. 29, 2010 (JP) .................................. 2010-171191

(51) Int. Cl.
B32B 5/16 (2006.01)

(52) U.S. Cl.
USPC ........... 428/402; 428/403; 427/212; 423/111; 423/594.9; 423/624

(58) Field of Classification Search
USPC ........ 428/402, 403; 427/212; 423/111, 594.9, 423/624
See application file for complete search history.

(56) References Cited

FOREIGN PATENT DOCUMENTS

| JP | 2000-003618 | * | 1/2000 |
|----|-------------|---|--------|
| JP | 2000-003618 A | | 1/2000 |
| JP | 3019551 B | | 3/2000 |
| JP | 2001-058822 A | | 3/2001 |
| JP | 2003-215328 A | | 7/2003 |
| JP | 2005-232399 A | | 9/2005 |
| JP | 2005-322626 A | | 11/2005 |
| JP | 2007-145712 A | | 6/2007 |
| JP | 2007-269543 A | | 10/2007 |
| JP | 2008-110915 | * | 5/2008 |
| JP | 2008-110915 A | | 5/2008 |

OTHER PUBLICATIONS

International Search Report dated Jan. 25, 2011, issued for PCT/JP2010/068872 and English translation thereof.

* cited by examiner

*Primary Examiner* — Leszek Kiliman
(74) *Attorney, Agent, or Firm* — Edwards Wildman Palmer LLP; James E. Armstrong, IV; Nicholas J. DiCeglie, Jr.

(57) ABSTRACT

One aspect of an indium tin oxide powder has a specific surface area of 55 m²/g or more, wherein a color tone is from bright yellow to a color of persimmons or a half-width in the peak of (222) plane is 0.6° or less on an X-ray diffraction chart. Another aspect of the indium tin oxide powder has a modified surface, wherein a specific surface area is 40 m²/g or more, a half-width in the peak of (222) plane is 0.6° or less on an X-ray diffraction chart, and a color tone is navy blue (L is 30 or less in a Lab colorimetric system). A method for producing the indium tin oxide powder includes: coprecipitating an indium tin hydroxide by using a tin ($Sn^{2+}$) compound under conditions in which pH is 4.0 to 9.3, and a temperature of a liquid is 5° C. or higher; and drying and calcining the indium tin hydroxide.

10 Claims, 7 Drawing Sheets

INDIUM TIN OXIDE POWDER, PRODUCTION METHOD THEREFOR, TRANSPARENT CONDUCTIVE COMPOSITION, AND INDIUM TIN HYDROXIDE

TECHNICAL FIELD

The present invention relates to an indium tin oxide (ITO) powder, a production method therefor, a transparent conductive composition containing the ITO powder, and an indium tin hydroxide. More particularly, the present invention relates to a fine ITO powder having high crystallinity, a production method thereof, a conductive composition that contains the ITO powder and is excellent in transparency, and an indium tin hydroxide that is obtained in a process of the production method.

The present application claims priority on Japanese Patent Application No. 2010-171191 filed on Jul. 29, 2010, the content of which is incorporated herein by reference.

BACKGROUND ART

Indium tin oxide is known as a transparent conductive material. For example, Patent Document 1 discloses an ITO powder in which a Sn/In ratio is 0.005 to 0.3, a specific surface area (BET value) is 10 m²/g or more, a specific resistance is 70 Ωcm or less, a content of Cl is 0.1% or less, a content of Na and K is 10 ppm or less, and a content of free In and Sn is 10 ppm or less. In addition, Patent Document 2 discloses an ITO powder in which a specific surface area is 4 to 20 m²/g, and a color tone of the powder, L is 82 to 91 in a Lab colorimetric system.

The ITO powder is used as a material for forming a conductive film, an infrared ray shielding layer, or the like. For example, ITO powders are dispersed in a resin to prepare a coating material. This coating material is applied to a substrate to form a conductive film. In the alternative, the coating material is dispersed in a resin to manufacture a film, and this film is adhered onto a substrate to form a conductive film. Or, the film is interposed between laminated glasses to form a conductive layer or an infrared ray shielding layer, In the case of forming this conductive film, it is preferable that the ITO powder be as fine as possible so as to increase transparency of the film.

A specific surface area of the ITO powders disclosed in Patent Documents 1 and 2 is approximately 20 m²/g which is not very large. In view of this, there is known an ITO powder in which a specific surface area is increased so as to increase transparency. For example, Patent Document 3 discloses an ITO powder having a specific surface area of 50 m²/g or more. In addition, Patent Document 4 discloses an ITO powder having a specific surface area of 55 m²/g or more.

On the other hand, there is a tendency that when a primary particle size of the ITO powder decreases, crystallinity thereof decreases and conductivity deteriorates. Therefore, in order to form a film in which the transparency and the conductivity are high, a fine ITO powder is required in which the specific surface area is large and the crystallinity is high, Here, with regard to the ITO powders disclosed in Patent Documents 3 and 4, the specific surface area is larger than that of a product in the related art, and the ITO powders are finer than that of the product in the related art. However, in a color tone of each of the powders, L is approximately 52 to 90 (a water color to a dilute water color) in a Lab colorimetric system. According to this color tone of the powder, the crystallinity is not so high.

PRIOR ART DOCUMENT

Patent Document

Patent Documents 1: Japanese Patent No. 3019551
Patent Documents 2: Japanese Unexamined Patent Application, First Publication No. 2005-322626
Patent Documents 3: Japanese Unexamined Patent Application, First Publication No. 2005-232399
Patent Documents 4: Japanese Unexamined Patent Application, First Publication No. 2003-215328

DISCLOSURE OF THE INVENTION

Problems to be Solved by the Invention

The present invention aims to provide an ITO powder that is fine and has high crystallinity, and the ITO powder is capable of forming a conductive film that is excellent in transparency and has high conductivity, and the present invention also aims to provide a method for producing the ITO powder, a transparent conductive composition containing the ITO powder, and an indium tin hydroxide.

Means for Solving the Problems

A first aspect of an indium tin oxide powder of the present invention has a specific surface area in a range of 55 m²/g or more, wherein a color tone is from bright yellow to a color of persimmons.

A second aspect of the indium tin oxide powder of the present invention has a specific surface area in a range of 55 m²/g or more, wherein a half-width in the peak of (222) plane is in a range of 0.6° or less on an X-ray diffraction chart.

A third aspect of the indium tin oxide powder of the present invention has a modified surface, wherein a specific surface area is in a range of 40 m²/g or more, a half-width in the peak of (222) plane is in a range of 0.6° or less on an X-ray diffraction chart, and a color tone is navy blue (L is in a range of 30 or less in a Lab colorimetric system).

One aspect of a transparent conductive composition of the present invention contains any one of the first to third aspects of the indium tin oxide powders of the present invention.

In one aspect of the transparent conductive composition of the invention, in the case of forming a film in which a concentration of the indium tin oxide powder is 6 wt % on a glass plate using the transparent conductive composition, a surface resistivity of the film may be in a range of 20,000 Ω/sq. or less, and a Δ transmittance obtained by subtracting a transmittance of the glass plate from a total light transmittance may be in a range of 2% or less, and in the case of forming a film in which a concentration of the indium tin oxide powder is 20 wt % on a glass plate using the transparent conductive composition, a surface resistivity of the film may be in a range of 6,500 Ω/sq. or less, and a Δ transmittance obtained by subtracting a transmittance of the glass plate from a total light transmittance may be in a range of 5% or less.

One aspect of a method for producing an indium tin oxide powder of the present invention includes: a process of coprecipitating an indium tin hydroxide by using a tin ($Sn^{2+}$) compound under conditions in which pH is 4.0 to 9.3, and a temperature of a liquid is in a range of 5° C. or higher, wherein the indium tin hydroxide has a color tone from bright yellow to a color of persimmons in a dried powder state; and a process of drying and calcining the indium tin hydroxide.

In one aspect of the method for producing the indium tin oxide powder of the present invention, in the process of coprecipitating the indium tin hydroxide, the indium tin hydroxide may be coprecipitated by dripping a mixed aqueous solution of indium trichloride and tin dichloride and an aqueous alkali solution to water at the same time or by dripping the mixed aqueous solution to the aqueous alkali solution.

In the process of drying and calcining the indium tin hydroxide, the indium tin hydroxide may be heated and calcined at the same time as the drying or after the drying under an atmosphere of only nitrogen gas or under an atmosphere of nitrogen gas containing any one kind selected from water vapor, alcohol, and ammonia so as to produce the indium tin oxide powder in which a surface is modified, a specific surface area is in a range of 40 m$^2$/g or more, and a color tone is navy blue.

One aspect of an indium tin hydroxide of the present invention includes a coprecipitate that is obtained by mixing a mixed aqueous solution of indium trichloride and tin dichloride with an aqueous alkali solution, wherein the indium tin hydroxide has a color tone from bright yellow to a color of persimmons in a dried powder state.

Here, the indium tin hydroxide according to the one aspect of the present invention may be present in a washed state or in a dried state.

Effects of the Invention

The first and second aspects of the ITO powders of the present invention are fine powders having a specific surface area of 55 m$^2$/g or more, and having a color tone of bright yellow in a dried powder state different from an ITO powder in the related art. In addition, the third aspect of the ITO powder of the invention is a surface-modified powder in which a specific surface area is in a range of 40 m$^2$/g or more and a color tone is navy blue (L is in a range of 30 or less in a Lab colorimetric system). For example, the third aspect of the ITO powder may be a powder in which a half-width in the peak of (222) plane is in a range of 0.6° or less on an X-ray diffraction chart, and crystallinity is high.

The first to third aspects of the ITO powders of the invention may be used as a transparent conductive composition. Since the first to third aspects of the ITO powders of the invention are fine, a film excellent in transparency may be formed. Furthermore, since the ITO powders have high crystallinity, a film excellent in conductivity may be obtained. Furthermore, since the first to third aspects of the ITO powders of the invention are excellent in an infrared ray shielding effect, a film in which a solar radiation transmittance is low while maintaining a high transparency may be formed. In addition, a film-whitening suppressing effect is also excellent.

BEST MODE FOR CARRYING OUT THE INVENTION

Figure 1:
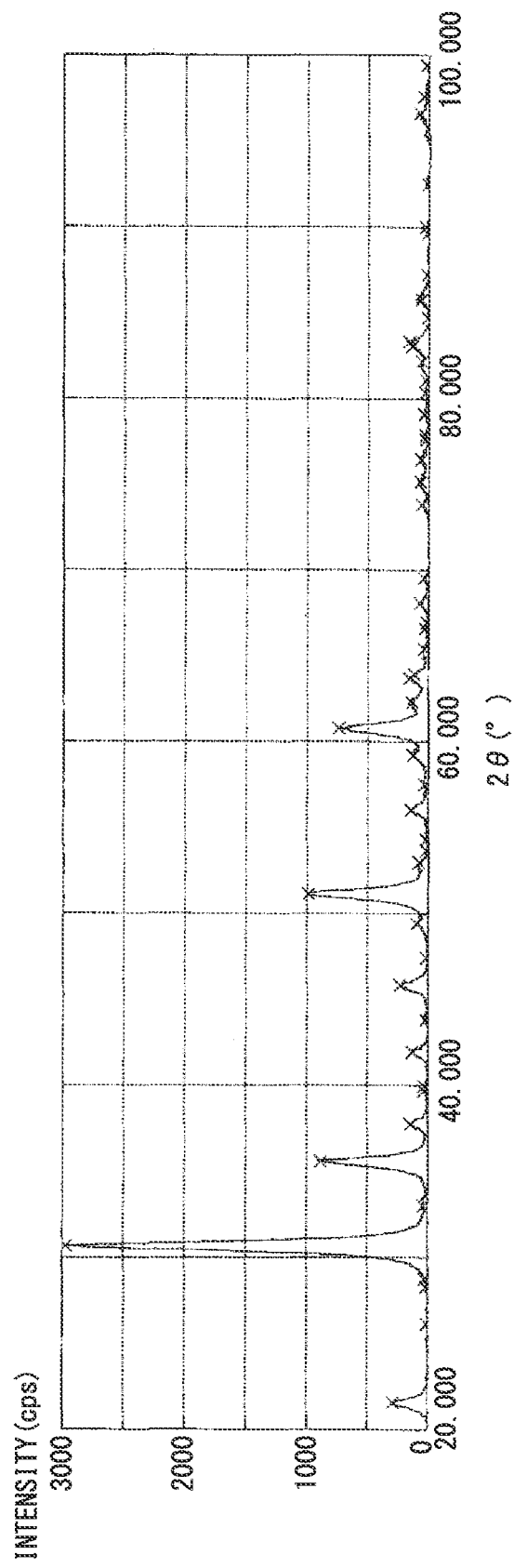
FIG. 1 is an X-ray diffraction pattern of a surface-modified ITO powder of No. 1 in Table 1.

Hereinafter, an embodiment of the invention will be described in detail,

[ITO Powder]

A specific surface area of an ITO powder of this embodiment is 55 m$^2$/g or more. In this ITO powder, a color tone is bright yellow in a dried powder state, or a half-width in the peak of (222) plane is in a range of 0.6° or less on an X-ray diffraction chart, In addition, a specific surface area of a surface-modified ITO powder of this embodiment is 40 m$^2$/g or more. In this surface-modified ITO powder, a color tone is navy blue (L is in a range of 30 or less in a Lab colorimetric system) in a dried powder state, and a half-width in the peak of (222) plane is in a range of 0.6° or less on an X-ray diffraction chart.

In addition, in this specification, the surface-modified ITO powder may be simply described as ITO powder.

[Producing Method]

A method for producing the indium tin oxide powder of this embodiment includes a process of obtaining an indium tin hydroxide by coprecipitation, and a process of drying and calcining the indium tin hydroxide. Specifically, an indium tin hydroxide is prepared by coprecipitation, and the indium tin hydroxide has a color tone from bright yellow to a color of persimmons (reddish brown or orange-red) in a dried powder state, is prepared by coprecipitation. Subsequently, this indium tin hydroxide is calcined to produce an indium tin oxide powder.

(Process of Coprecipitating Indium Tin Hydroxide)

A mixed aqueous solution containing indium ions and tin ions and an aqueous alkali solution are mixed so as to precipitate the indium ions and the tin ions in the resultant mixture (aqueous reaction solution) under presence of an alkali. According to this precipitation, a coprecipitated hydroxide of indium and tin (a coprecipitated indium tin hydroxide) of this embodiment is generated.

A mixed solution containing the indium ions and the tin ions is prepared using a tin ($Sn^{2+}$) compound such as $SnCl_2 \cdot 2H_2O$ and the like. As a raw material for the indium ions, indium trichloride ($InCl_3$) may be used.

pH of the aqueous reaction solution is adjusted to be in a range of 4.0 to 9.3, and preferably in a range of 6.0 to 8.0, and a temperature of a liquid is adjusted to be in a range of 5° C. or higher, and preferably in a range of 10 to 80° C. Thereby, a coprecipitated indium tin hydroxide having a color tone from bright yellow to a color of persimmons in a dried powder state can be precipitated. The hydroxide has a color tone from bright yellow to a color of persimmons in a dried powder state, and the hydroxide has a crystallinity that is higher than that of a white-colored indium tin hydroxide in the related art.

In the case where a tin ($Sn^{4+}$) compound such as $SnCl_4$ and the like is used as a raw material for the tin ions, a white-colored precipitate (indium tin hydroxide) is generated, and thus a precipitate having a color tone from bright yellow to a color of persimmons in a dried powder state is not obtained. In addition, in the case where pH of a reaction solution is lower than 4.0 (acid side), or in the case where pH of the reaction solution is higher than 9.3 (alkali side), a light-yellowish white precipitate (indium tin hydroxide) is generated, and thus a precipitate having a color tone from bright yellow to a color of persimmons in a dried powder state is not obtained. Both of the white-colored precipitate obtained using the tin ($Sn^{4+}$) compound and the light-yellowish white precipitate have crystallinity that is lower than that of the precipitate having a color tone from bright yellow to a color of persimmons. Even when the white-colored precipitate and the light-yellowish white precipitate are calcined, the ITO powder having high crystallinity of this embodiment can not be obtained. In addition, in a manufacturing method in Patent Document 1, tin teterachloride is used; and therefore, a white-colored precipitate of the indium tin hydroxide is generated, and thus a precipitate having a color tone from bright yellow to a color of persimmons in a dried powder state is not obtained.

In order to control pH of a reaction solution to he within a range of 4.0 to 9.3 during reaction, for example, a mixed aqueous solution and an aqueous alkali solution may be dripped to water in a container. Alternately, the mixed aqueous solution may be dripped to the aqueous alkali solution. As the mixed aqueous solution, as described above, a mixed aqueous solution of indium trichloride ($InCl_3$) and tin dichloride ($SnC_2 2.H_2O$) may be used. In addition, as the aqueous alkali solution, an aqueous ammonia ($NH_3$) solution, an aqueous ammonium hydrogen carbonate ($NH_4HCO_3$) solution, or the like may be used.

Specifically, as shown in Examples 1 to 3 (Nos. 1 to 3), in the case where a mixed aqueous solution is prepared using tin dichloride, pH of an aqueous reaction solution is adjusted to 7, and a temperature of a liquid is adjusted to be in a range of 10 to 60° C., a precipitate having a color tone from bright yellow to a color of persimmons in a dried powder state is generated.

On the other hand, as shown in Comparative Example 1 (No. 7), in the case where pH of the aqueous reaction solution is 3.0 (less than 4.0), a light-yellowish white precipitate is generated. In addition, as shown in Comparative Example 2 (No. 8), in the case where pH of the aqueous reaction solution is 9.5 (exceeds 9.3), similarly, a light-yellowish white precipitate is generated.

Therefore, it is necessary to adjust pH of the aqueous reaction solution to be in a range of 4.0 to 9.3 so as to generate a coprecipitated indium tin hydroxide having a color tone from bright yellow to a color of persimmons in a dried powder state. In addition, the closer pH is to neutral pH, the greater is a tendency for the color tone of the precipitate in a dried powder state to be a color of persimmons. Furthermore, as shown in Comparative Example 3 (No. 9), in the case of using tin tetrachloride ($SnCl_4$), a white-colored precipitate is generated, and thus a precipitate is not generated which has a color tone from bright yellow to a color of persimmons in a dried powder state and has high crystallinity.

After generation of the coprecipitated indium tin hydroxide, the coprecipitate (coprecipitated indium tin hydroxide) is washed with pure water. The washing is performed until resistivity of a supernatant liquid reaches 5,000 Ωcm or more, and preferably 50,000 Ωcm. Subsequently, solid-liquid separation is performed so as to collect the coprecipitate. In the case where the resistivity of the supernatant liquid is lower than 5,0000 Ωcm impurities such as chlorine and the like are not sufficiently removed, and thus a highly pure indium tin oxide powder may not be obtained.

The indium tin hydroxide has a color tone from bright yellow to a color of persimmons (reddish brown or orange-red) in a dried powder state, and L is in a range of 80 or less, a is in a range of −10 to +10, and h is in a range of +26 or more in a Lab colorimetric system. For example, with regard to color tones of indium tin hydroxides that are obtained in Examples 1 to 6 (Nos. 1 to 6), L is in a range of 60.3 to 75.1, a is in a range of −2.3 to +4.2, and b is in a range of +21.9 to +32.2, In addition, with regard to color tones of indium tin hydroxides that are obtained in Comparative Examples 1 to 3 (Nos. 7 to 9), L is in a range of 91 to 100, and these precipitates are precipitates having white-based color.

(Process of Drying and Calcining Indium Tin Hydroxide)

The indium tin hydroxide is dried and calcined to obtain an ITO powder (indium tin oxide powder). For example, the indium tin hydroxide is heated and dried at a temperature of 100 to 200° C. for 2 to 24 hours under an air atmosphere. Subsequently, the dried indium tin hydroxide is heated and calcined at a temperature of 250° C. or more and preferably 400 to 800° C. for one to six hours under an air atmosphere. In the case where the calcining temperature is lower than 250° C., the indium tin hydroxide remains in a hydroxide state as is, and is not converted into an oxide. Due to this calcining treatment, the indium tin hydroxide is oxidized; and thereby, an indium tin oxide powder having a color tone from bright yellow to a color of persimmons can be obtained.

The ITO powder that is subjected to the calcining treatment under the air atmosphere has a color tone from bright yellow to a color of persimmons (reddish brown or orange-red). Specifically, in a Lab colorimetric system, L is in a range of 80 or less, a is in a range of −10 to +10, and b is in a range of +26 or more. For example, with regard to color tones of ITO powders that are obtained in Examples 1 to 6 (Nos. 1 to 6), L is in a range of 56.0 to 67.1, a is in a range of −1.2 to +2.1, and b is in a range of +29.5 to +31.5.

On the other hand, an ITO powder, which is obtained by calcining a indium tin hydroxide having white-based color under an air atmosphere, has a color tone of olive-green, and with regard to the color tone thereof, a value is −5 or less in a Lab colorimetric system as shown in comparative examples.

The ITO powder is a fine powder having a BET specific surface area of 55 $m^2/g$ or more, The BET specific surface area is preferably in a range of 60 $m^2/g$ or more. Specifically, the BET specific surface areas of ITO powders of Examples 1 to 6 are in a range of 60 to 85 $m^2/g$. On the other hand, the BET specific surface areas of ITO powders of Comparative Examples 1 to 3 are in a range of 45 to 48 $m^2/g$. Therefore, the ITO powders of Examples 1 to 6 are fine powders having specific surface areas that are much larger than those of ITO powders of Comparative Examples 1 to 3.

Figure 2:
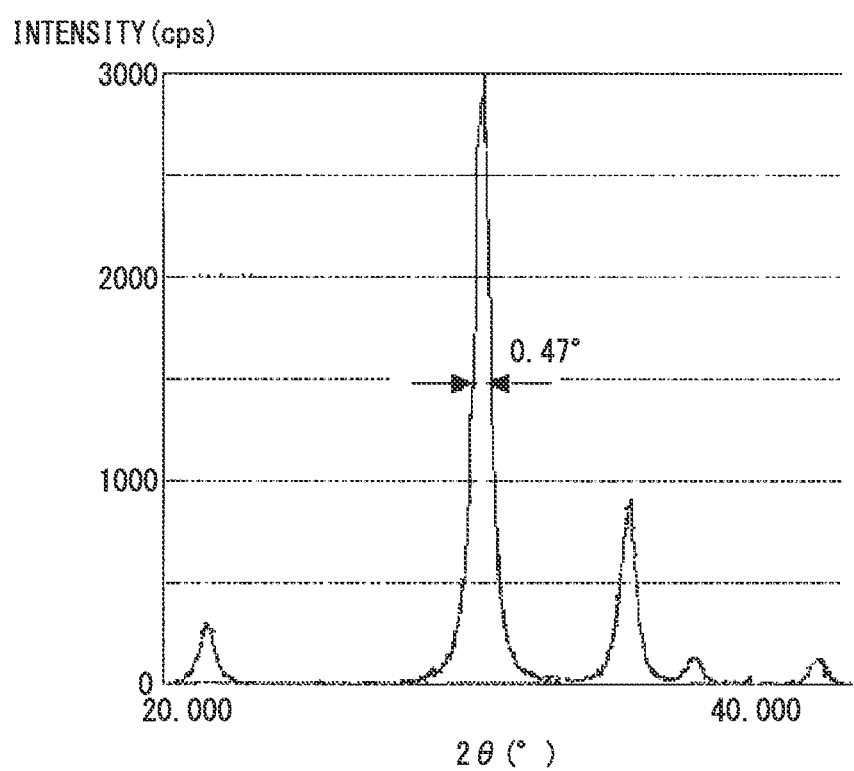
FIG. 2 is a partially enlarged diagram of FIG. 1.

The ITO powder having a color tone from bright yellow to a color of persimmons has high crystallinity. For example, as shown in FIGS. 1 and 2, with regard to the ITO powder of No, 1 of Example 1, a relative intensity of the diffraction peak of (222) plane on an X-ray diffraction chart is large (approximately 3,000 cps), and a half-width thereof is smaller than 0.6° (specifically, 0.47°).

Figure 4:
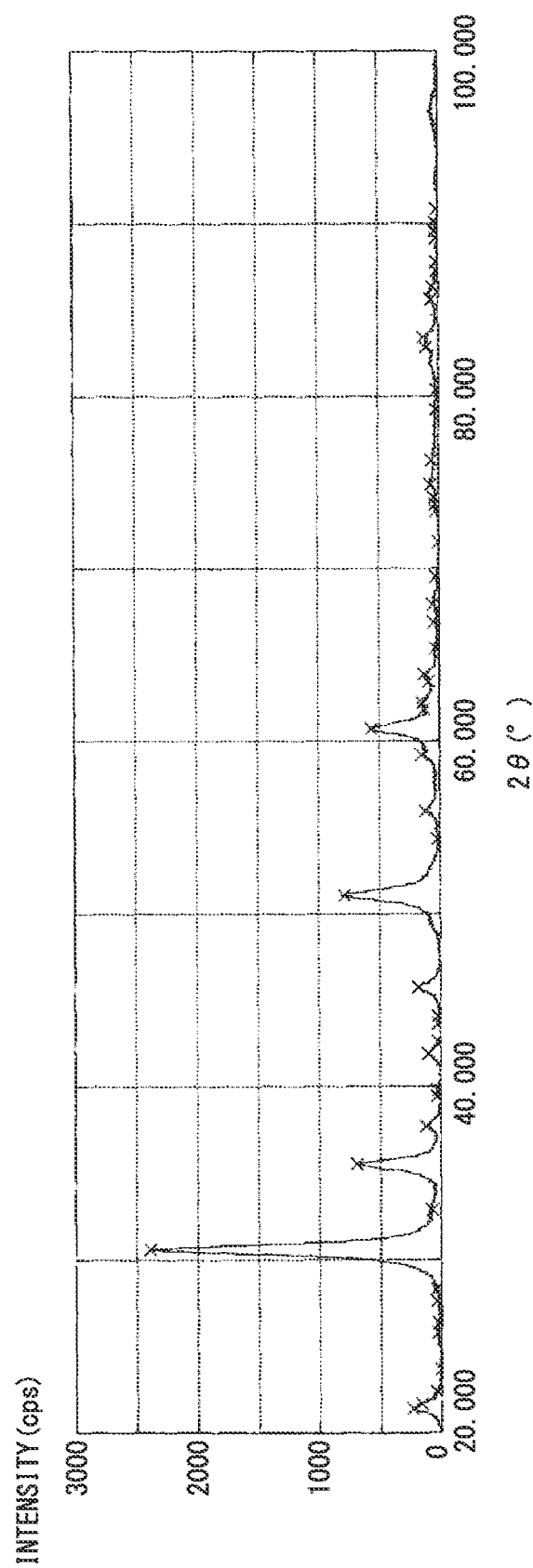
FIG. 4 is an X-ray diffraction pattern of a surface-modified ITO powder of No. 9 in Table 1.

On the other hand, an ITO powder of No. 9 of Comparative Example 3 is prepared by calcining a white-colored indium tin hydroxide, and the color of the ITO powder is olive-green. As shown in FIG. 4, a relative intensity of the diffraction peak of (222) plane on an X-ray diffraction chart is 2,500 or less, and a half-width thereof is larger than 0.6° (specifically, 0.65°).

As described above, it can be seen that the ITO powders corresponding to this embodiment are powders having a half-width much smaller than those of ITO powders of comparative examples and a crystallinity higher than those of the ITO powders of comparative examples.

A surface modification treatment may be performed during a drying and calcining treatment of the coprecipitated indium tin hydroxide (coprecipitated In-Sn hydroxide), or after the drying and calcining treatment. By subjecting the ITO powder to the surface modification treatment (surface treatment), conductivity is improved, and transparent conductivity effects can be further increased.

As described in the following (1) to (3), the surface modification treatment may be performed at any one of a stage at the same time as drying, a stage during calcining after the drying, or a stage after the calcining.

(1) Instead of the above-described drying and calcining treatment of the indium tin hydroxide under the air atmosphere, a surface modification treatment is performed under the following conditions. Heating treatment is performed at a temperature of 250 to 800° C. for 30 minutes to six hours under either one of a nitrogen atmosphere, a nitrogen atmosphere containing water vapor, a nitrogen atmosphere containing alcohol, or a nitrogen atmosphere containing ammonia to dry and calcine the indium tin hydroxide.

(2) The indium tin hydroxide is dried at a temperature of 100 to 110° C. under the air atmosphere for one night, and then instead of the above-described calcining under the air atmosphere, a surface modification treatment is performed under the following conditions. Heating treatment is performed at a temperature of 250 to 800° C. for 30 minutes to six hours under either one of a nitrogen atmosphere, a nitrogen atmosphere containing water vapor, a nitrogen atmosphere containing alcohol, or a nitrogen atmosphere containing ammonia to calcine the indium tin hydroxide.

(3) The above-described indium tin hydroxide is dried and calcined under an air atmosphere, and then a surface modification treatment is performed under the following conditions. Heating treatment is performed at a temperature of 250 to 800° C. for 30 minutes to six hours under either one of a nitrogen atmosphere, a nitrogen atmosphere containing water vapor, a nitrogen atmosphere containing alcohol, or a nitrogen atmosphere containing ammonia.

In the above-described surface modification treatments (1) to (3), the heating treatment is performed at approximately the same temperature as the calcining; and therefore, when the indium tin hydroxide is subjected to the surface modification treatment, the drying and the calcining are performed at the same time.

In addition, a surface treatment liquid containing alcohol or water may be prepared, and then the surface modification treatment may be performed in a state in which the indium tin hydroxide or the indium tin oxide is impregnated with the surface treatment liquid.

The surface-modified ITO powder is a navy blue-colored powder having a BET specific surface area of 40 m$^2$/g or more. The BET specific surface area is preferably in a range of 50 m$^2$/g or more. Specifically, the surface-modified ITO powder has a color tone of navy blue in which an L value is in a range of 30 or less, a<0, and b<0 in a Lab colorimetric system. In addition, a half-width in the peak of (222) plane is in a range of 0.6° or less on an X-ray diffraction chart.

This surface-modified ITO powder is fine and has high crystallinity. Therefore, in the case where the surface-modified ITO powder is mixed with a resin to form a film or a sheet, high transparency and excellent conductivity may be obtained.

It is known that conductivity of the indium tin oxide (ITO) is improved by doping tin ($Sn^{4+}$) to indium ($In^{3+}$). An oxygen vacancy point is present in an ITO crystal, and the oxygen vacancy point has a donor effect. Conductivity is improved by increasing a carrier density. In the case where the ITO powder is heat-treated under an inert atmosphere or under reduced pressure, oxygen is removed from the ITO crystal, and thus a number of the oxygen vacancy points increases, and volume resistivity of the ITO decreases. Therefore, when the surface modification is performed, a number of oxygen defects increases, and thus conductivity can be increased.

As described above, when the indium tin hydroxide, which has a color tone from bright yellow to a color of persimmons in a dried powder state, is calcined, the ITO powder and the surface-modified ITO powder of this embodiment can be obtained. The ITO powder and the surface-modified ITO powder of this embodiment have excellent conductivity, and thus may be used as a transparent conductive composition to form a highly transparent film or sheet.

A transparent conductive composition that is superior in transparency and is excellent in conductivity can be obtained by using the ITO powder of this embodiment. Specifically, in the case where the ITO powder of this embodiment is dispersed in a resin to prepare a coating material (transparent conductive composition), and this coating material is applied to a glass plate to form a film, a film having the following characteristics can be formed.

With regard to a film in which the film thickness is 0.2 μm and a concentration of the ITO powder is 6 wt %, a surface resistivity is in a range of 20,000 Ω/sq. or less, and a total light transmittance is in a range of 89% or more. Here, the total light transmittance represents a transmittance of light that transmits through the glass plate and the film formed on the glass plate. A transmittance (Δ transmittance) obtained by subtracting a transmittance of only the glass plate from a total light transmittance is in a range of 2% or less.

With regard to a film in which the film thickness is 0.2 pm and a concentration of the ITO powder is 20 wt %, a surface resistivity is 6,500 Ω/sq. or less, and a total light transmittance is in a range of 85% or more. A Δ transmittance of this film is in a range of 5% or less.

As described above, a film can be obtained which is highly transparent and is excellent in conductivity,

EXAMPLES

Hereinafter, examples of this embodiment will be described together with comparative examples.

ITO powders were prepared by the procedure to be described below, and an X-ray diffraction pattern, a specific surface area, and a color tone (Lab value) of the ITO powders or the like were measured by the methods to be described below.

[X-Ray Diffraction Pattern] An X-ray diffraction pattern was measured using a measuring device (trade name: Mini Flex II) manufactured by Rigaku Corporation.

[Specific Surface Area] A BET specific surface area was measured using a measuring device (SA-1100) manufactured by Shibata Scientific Technology Ltd.

[Color Tone] A color tone (Lab values (L, a, and b)) was measured using a color computer (SM-T) manufactured by Suga Test Instruments Co., Ltd.

Example 1

Sample No. 1

50 mL (a content of In was 18 g) of an aqueous indium chloride ($InCl_3$) solution and 3.6 g of tin dichloride ($SnCl_2.2H_2O$) were mixed to prepare a mixed aqueous solution. In addition, an aqueous ammonia ($NH_3$) solution was prepared as an aqueous alkali solution. The mixed aqueous solution and the aqueous alkali solution were dripped into a 500 ml container at the same time. The pH of the mixture (reaction liquid) inside the container was set to 7 by adjusting an added amount of the aqueous alkali solution. A temperature of the liquid was adjusted to 30° C., and the mixture was caused to react for 30 minutes. A generated precipitate was repetitively subjected to inclination washing (decantation) by using ion exchange water. Specifically, in the inclination washing, washing of the precipitate was performed in such a manner that a supernatant liquid was discarded, the ion exchange water was newly added to and mixed with the precipitate, and this resultant mixture was left as it was. When resistivity of the supernatant liquid became 50,000 Ω·cm or more, the precipitate (In/Sn coprecipitated hydroxide) was filtered to obtain a coprecipitated indium tin hydroxide. It was confirmed that the coprecipitated indium tin hydroxide had a color tone of a color of persimmons (reddish drown or orange-red) in a dried powder state.

Figure 3:
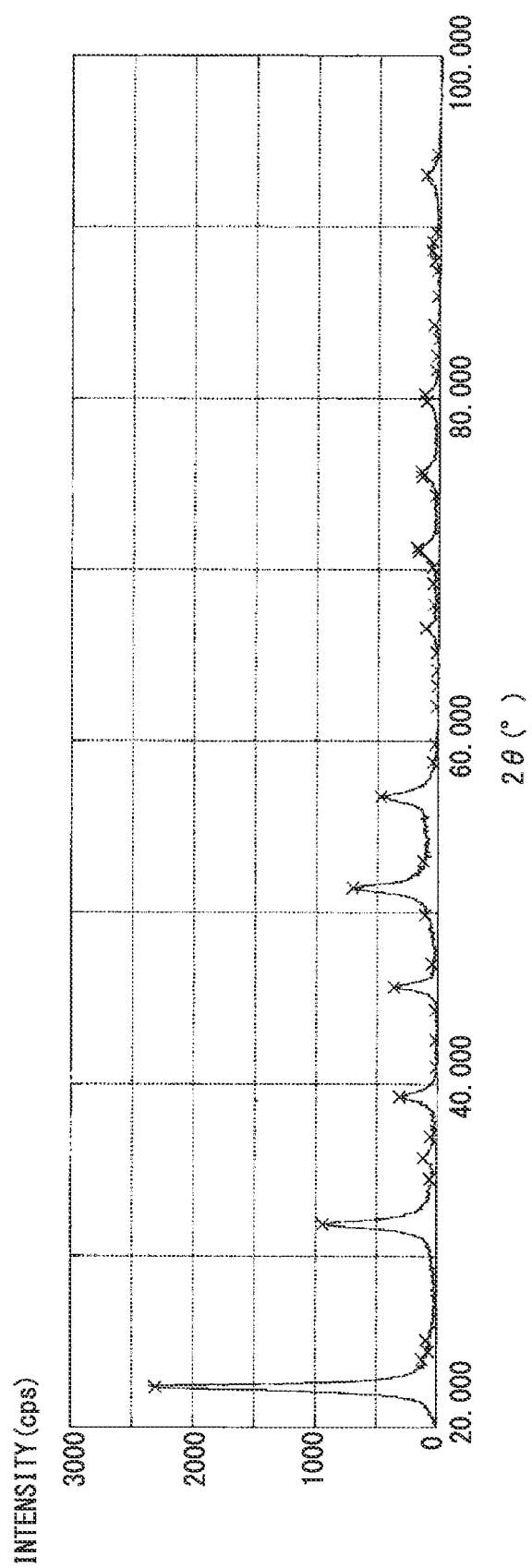
FIG. 3 is an X-ray diffraction pattern of a coprecipitated indium tin hydroxide of No. 1 in Table 1.
Figure 7:
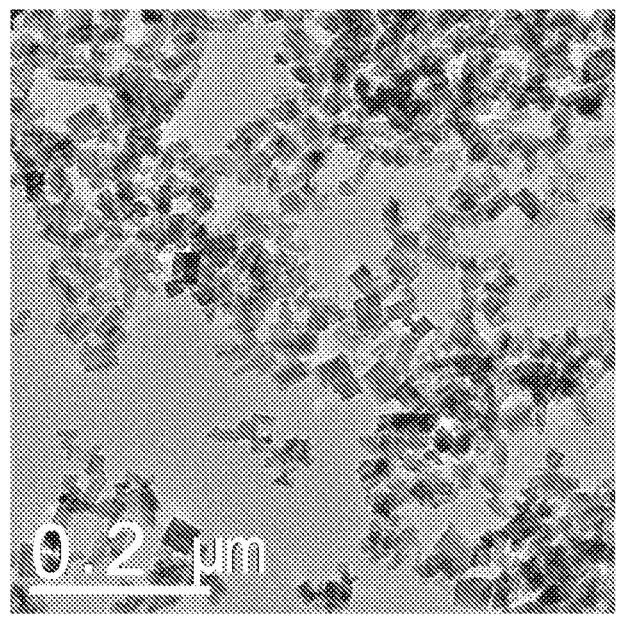
FIG. 7 is a TEM photograph of the coprecipitated indium tin hydroxide of No. 1 in Table 1.

An X-ray diffraction pattern of the coprecipitated indium tin hydroxide is shown in FIG. 3, In addition, a TEM photograph of the coprecipitated indium tin hydroxide powder is shown in FIG. 7. As shown in FIG. 7, it is confirmed that in the coprecipitated indium tin hydroxide powder, a shape of a crystal can be clearly recognized and a crystallinity thereof is high.

The coprecipitated indium tin hydroxide, which was subjected to solid-liquid separation, was dried at 110° C. for one night, and then the dried indium tin hydroxide was calcined at 550° C. for three hours under an air atmosphere. Aggregates in the obtained calcined material were crushed; and thereby, approximately 25 g of an ITO powder that had a bright yellow color was obtained.

A Lab value and a specific surface area of this ITO powder are shown in Table 1.

Next, 5 parts by weight of distilled water was mixed with 95 parts by weight of dehydrated methanol to prepare a surface treatment liquid. 25 g of the ITO powder was added to and impregnated with this surface treatment liquid. Subsequently, the ITO powder that was impregnated with the surface treatment liquid was put into a glass schale, and the ITO powder was heated at 330° C. for two hours under a nitrogen gas atmosphere to perform the surface modification treatment.

A color tone (L, a, and b) and a BET value of the surface-modified ITO powder are shown in Table 1.

In addition, an X-ray diffraction pattern of this surface-modified ITO powder is shown in FIG. 1. Furthermore, a partially enlarged diagram at or in the vicinity of the diffraction peak of (222) plane is shown in FIG. 2, As shown in FIGS. 1 and 2, it was confirmed that a relative intensity of the diffraction peak of the surface-modified ITO powder was large (approximately 3,000 cps), and a half-width was 0.47°; and therefore, crystallinity was high. Furthermore, from the obtained X-ray diffraction pattern, it was confirmed that a crystal system of the surface-modified ITO powder was a cubic system.

Examples 2 and 3

Sample Nos. 2 and 3

A liquid temperature of the reaction liquid was adjusted to 10° C. or 60° C. ITO powders and surface-modified ITO powders were obtained in the same manner as Example 1 except for the temperature adjustment. Evaluation results of these ITO powders are shown in Table 1.

Examples 4 and 5

Sample Nos. 4 and 5

An added amount of an aqueous alkali solution (aqueous ammonia solution) was adjusted to set pH of the reaction liquid to 4.5 or 8.5. In addition, a temperature of the liquid was adjusted to 30° C. ITO powders and surface-modified ITO powders were obtained in the same manner as Example 1 except for the added amount adjustment and the pH adjustment. Evaluation results of these ITO powders are shown in Table 1.

Example 6

Sample No. 6

Instead of the aqueous ammonia solution, an aqueous ammonium hydrogen carbonate ($NH_4HCO_3$) solution was used as the aqueous alkali solution. An ITO powder and a surface-modified ITO powder were obtained in the same manner as Example 1 except for the aqueous alkali solution. A precipitation condition, a color tone of a precipitate, color tones and specific surface areas of the ITO powders, and results of the surface treatment are shown in Table 1.

Comparative Example 1

Comparative Sample No. 7

An added amount of the aqueous alkali solution was adjusted to set pH of the reaction liquid to 3.0. A coprecipitated indium tin hydroxide was obtained in the same manner as Example 1 except for the pH adjustment. When being dried, the coprecipitated indium tin hydroxide was slightly-yellowish white in a dried powder state. This coprecipitate (coprecipitated indium tin hydroxide) was subjected to drying, calcining, and surface modification in the same manner as Example 1 to obtain an ITO powder and a surface-modified ITO powder. Evaluation results of these ITO powders are shown in Table 1.

Comparative Example 2

Comparative Sample No. 8

An added amount of the aqueous alkali solution was adjusted to set pH of the reaction liquid to 9.5. In addition, a temperature of the liquid was adjusted to 10° C. A coprecipitated indium tin hydroxide was obtained in the same manner as Example 1 except for the pH adjustment and the temperature adjustment. When being dried, the coprecipitated indium tin hydroxide was slightly-yellowish white in a dried powder state. This coprecipitate (coprecipitated indium tin hydroxide) was subjected to drying, calcining, and surface modification in the same manner as Example 1 to obtain an ITO powder and a surface-modified ITO powder. Evaluation results of these ITO powders are shown in Table 1.

Comparative Example 3

Comparative Sample No. 9

An aqueous $SnCl_4$ solution having a concentration of 55% was prepared using tin tetrachloride as a tin compound. 14.4 g of the aqueous $SnCl_4$ solution and 90 mL (a content of In was 35 g) of indium chloride ($InCl_3$) were mixed to prepare a mixed aqueous solution. 0.6 L of an aqueous alkali solution containing 190 g of an aqueous ammonium hydrogen carbonate ($NH_4HCO_3$) was added to the mixed aqueous solution to obtain a mixture (reaction liquid). The pH of the reaction liquid was adjusted to 8, and a temperature of the liquid was adjusted to 30° C., and the mixture was caused to react for 30 minutes. A generated precipitate was repetitively subjected to inclination washing by using ion exchange water. When resistivity of the supernatant liquid became 50,000 Ω·cm or more, the precipitate (In/Sn coprecipitated hydroxide) was filtered to obtain a coprecipitated indium tin hydroxide. This coprecipitated indium tin hydroxide was white.

Figure 6:
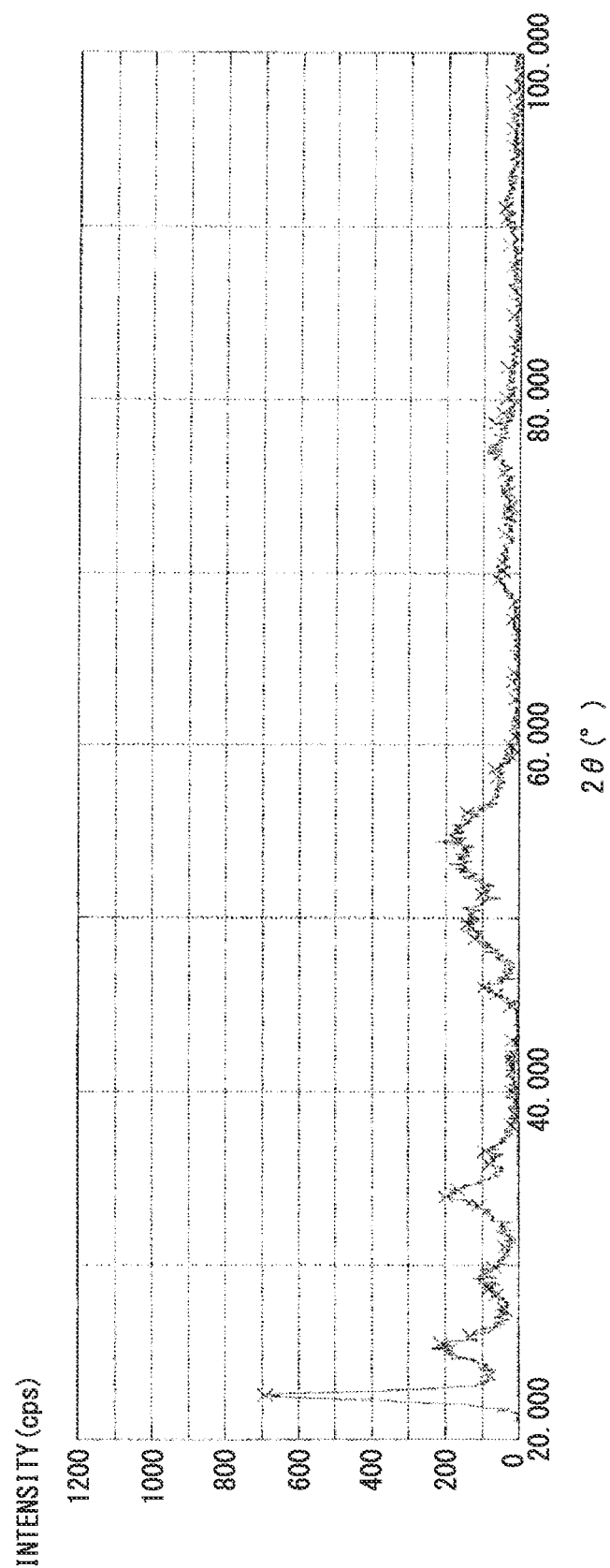
FIG. 6 is an X-ray diffraction pattern of a coprecipitated indium tin hydroxide of No. 9 in Table 1.
Figure 8:
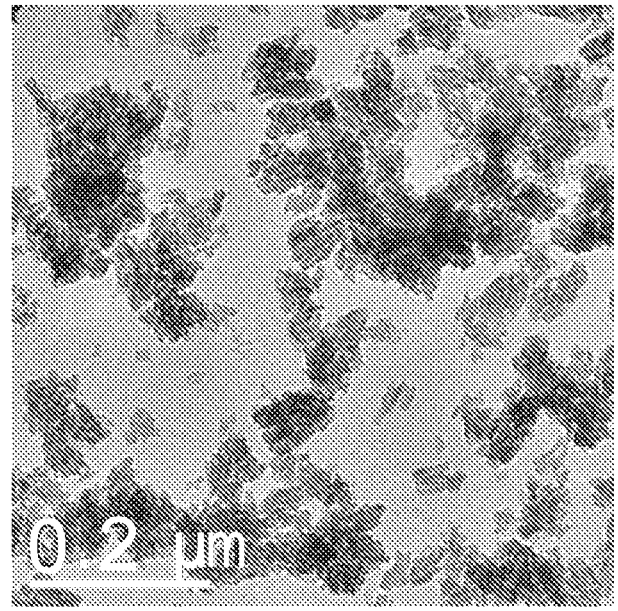
FIG. 8 is a TEM photograph of the coprecipitated indium tin hydroxide of No. 9 in Table 1.

An X-ray diffraction pattern of the coprecipitated indium tin hydroxide is shown in FIG. 6. In addition, a TEM photograph of the coprecipitated indium tin hydroxide powder is shown in FIG. 8. When being compared with the coprecipitated indium tin hydroxide powder (No. 1 of Example 1) of FIG. 7, a shape of a crystal of the coprecipitated indium tin hydroxide powder shown in FIG. 8 was not clear.

The coprecipitated indium tin hydroxide was dried at 110° C. for one night, and then was calcined at 550° C. for three hours under an air atmosphere. Aggregates in the obtained calcined material was crushed; and thereby, approximately 44 g of an ITO powder was obtained.

Evaluation results of the ITO powder are shown in Table 1.

Next, 5 parts by weight of distilled water was mixed with 95 parts by weight of dehydrated methanol to prepare a surface treatment liquid. 25 g of the ITO powder was added to and impregnated with this surface treatment liquid. Subsequently, the ITO powder that was impregnated with the surface treatment liquid was put into a glass schale, and the ITO powder was heated at 330° C. for two hours under a nitrogen gas atmosphere to perform the surface modification treatment.

A Lab value and a specific surface area of the surface-modified ITO powder are shown in Table 1.

Figure 5:
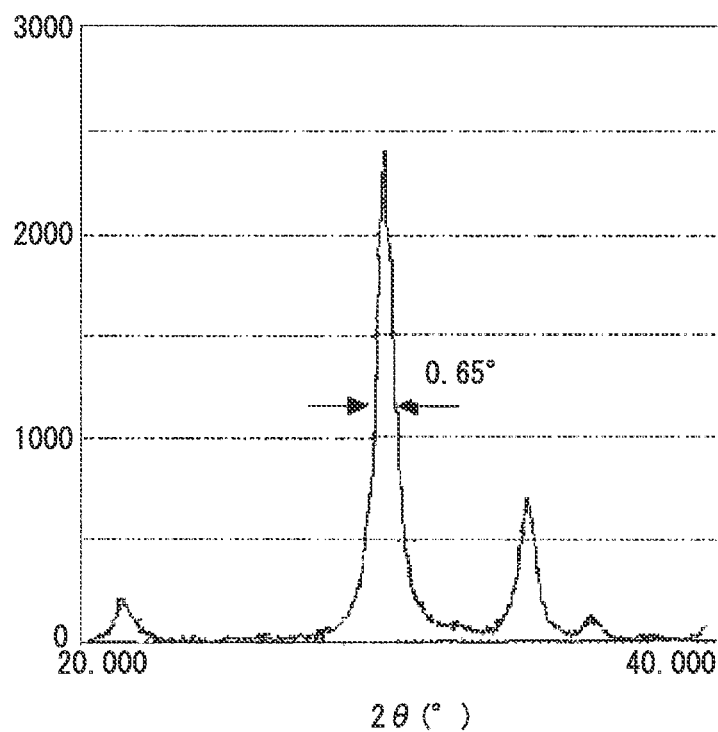
FIG. 5 is a partially enlarged diagram of FIG. 4.

In addition, an X-ray diffraction pattern of this surface-modified ITO powder is shown in FIG. 4. Furthermore, a partially enlarged diagram at or in the vicinity of the diffraction peak of (222) plane is shown in FIG. 5. As shown in FIGS. 4 and 5, it was confirmed that a relative intensity of the diffraction peak of the surface-modified ITO powder was lower than 2,500 cps, and a half-width was 0.65°; and therefore, crystallinity was lower than that of the surface-modified ITO powder (sample No. 1) of Example 1.

As shown in Table 1, in any one of the samples (Nos. 1 to 6) of this embodiment, a coprecipitated indium tin hydroxide having a color tone from bright yellow to a color of persimmons (reddish brown or orange-red) was generated.

In the case where the pH was out of the range defined in this embodiment, as shown in Comparative Examples 1 and 2, a yellowish white precipitate (coprecipitated indium tin hydroxide) was generated. An ITO powder that was obtained by calcining this precipitate was olive-green (L was in a range of 77.8 to 82.5, a was in a range of −7.4 to −7.1, and b was in a range of 16.3 to 17.8).

In Comparative Example 3 in which tin tetrachloride was used, a white precipitate (coprecipitated indium tin hydroxide) was generated. An ITO powder that was obtained by calcining this precipitate was also olive-green (L was 77.8, a was −8.7, and b was 27.9).

With regard to the surface-modified ITO powder that was obtained by modifying the olive-green ITO powder (Comparative Example 3), as shown in an X-ray diffraction pattern of FIG. 5, a half-width in the peak of (222) plane was about 0.65°. On the other hand, with regard to the surface-modified ITO powder that was obtained by modifying the bright yellow ITO powder (Example 1), a half-width in the peak of (222) plane was about 0.47°, and it was confirmed that a crystallinity thereof was higher that of the surface-modified ITO powder of Comparative Example 3.

In addition, with regard to the ITO powders that were calcined under an air atmosphere in Examples 1 to 6, specific surface areas (BET values) were in a range of 60 to 85 $m^2/g$, and these values were much larger than specific surface areas (45 to 48 $m^2/g$) of the ITO powders of Comparative Examples 1 to 3 (approximately less than two times). This tendency was also found with regard to the surface-modification-treated ITO powder. As described above, the ITO powders of this embodiment were finer than the ITO powders of the comparative examples. Therefore, when the ITO powders of this embodiment are mixed to a resin to form a film, a highly transparent film can be formed.

When the bright yellow ITO powder of the embodiment is subjected to a surface treatment, the color of the powder turns navy blue (L is in a range of 30 or less). Therefore, when a film is formed using the ITO powders of this embodiment, a film having an excellent infrared ray shielding property can be formed. In addition, the film has an advantage in that it is hard for film-whitening to occur.

As shown in FIG. 7, the bright yellow coprecipitated indium tin hydroxide has high crystallinity. In the case where this coprecipitated indium tin hydroxide having high crystallinity is used, an ITO powder in which a specific surface area is large and crystallinity is high can be obtained (FIGS. 1 and 2). In the case where a conductive composition is prepared using this ITO powder, high transparency and excellent conductivity can be obtained.

Example 7

Sample No. 10

Approximately 25 g of ITO powder was obtained in the same manner as Example 1.

A glass schale into which the ITO powder was put, and a different glass schale into which 500 g of water was put were disposed in a heating furnace to he adjacent to each other. Then, the glass schales were heated at 330° C. for two hours under a nitrogen gas atmosphere to perform a surface modification treatment. Since water in the different glass schale was evaporated during the heating, the inside of the heating furnace became a nitrogen gas atmosphere containing water vapor. Therefore, the ITO powder was heated under the nitrogen gas atmosphere containing water vapor, and thus a surface thereof was modified.

Evaluation results of the ITO powder and the surface-modified ITO powder that were obtained are shown in Table 1.

TABLE 1

|  | Example 1 | Example 2 | Example 3 | Example 4 | Example 5 |
|---|---|---|---|---|---|
| Samples | No. 1 | No. 2 | No. 3 | No. 4 | No. 5 |
| Raw material of In | $InCl_3$ | $InCl_3$ | $InCl_3$ | $InCl_3$ | $InCl_3$ |
| Raw material of Sn | $SnCl_2$ | $SnCl_2$ | $SnCl_2$ | $SnCl_2$ | $SnCl_2$ |
| Aqueous alkali solution | $NH_3$ | $NH_3$ | $NH_3$ | $NH_3$ | $NH_3$ |

TABLE 1-continued

| Mixed liquid | | | | | |
|---|---|---|---|---|---|
| pH | 7 | 7 | 7 | 4.5 | 8.5 |
| Temperature | 30° C. | 10° C. | 60° C. | 30° C. | 30° C. |
| Color tone of coprecipitate | Color of persimmons | Bright yellow | Bright yellow | Bright yellow | Color of persimmons |
| L | 75.1 | 70.0 | 68.3 | 66.0 | 65.0 |
| a | −1.5 | 1.1 | 1.5 | −2.3 | 4.2 |
| b | 30.7 | 31.2 | 31.2 | 32.2 | 21.9 |
| Color tone of ITO powder | Bright yellow | Bright yellow | Bright yellow | Bright yellow | Bright yellow |
| L | 60.1 | 58.3 | 56.0 | 62.3 | 67.1 |
| a | 0.4 | 1.1 | −0.8 | −1.2 | 1.2 |
| b | 30.8 | 31.5 | 29.5 | 31.2 | 30.8 |
| BET value of ITO powder ($m^2/g$) | 71 | 85 | 60 | 72 | 72 |
| Color tone of ITO powder after modification treatment | Navy blue | Navy blue | Navy blue | Navy blue | Navy blue |
| L | 21.3 | 29.1 | 27.4 | 29.6 | 26.5 |
| A | −2.8 | −2.1 | −2.2 | −4.2 | −3.8 |
| B | −2.3 | −12.0 | −11.0 | −7.2 | −6.1 |
| BET value of ITO powder after modification treatment ($m^2/g$) | 55 | 71 | 42 | 55 | 56 |

| | Example 6 | Comparative Example 1 | Comparative Example 2 | Comparative Example 3 | Example 7 |
|---|---|---|---|---|---|
| Samples | No. 6 | No. 7 | No. 8 | No. 9 | No. 10 |
| Raw material of In | $InCl_3$ | $InCl_3$ | $InCl_3$ | $InCl_3$ | $InCl_3$ |
| Raw material of Sn | $SnCl_2$ | $SnCl_2$ | $SnCl_2$ | $SnCl_4$ | $SnCl_2$ |
| Aqueous alkali solution | $NH_4HCO_3$ | $NH_3$ | $NH_3$ | $NH_4HCO_3$ | $NH_3$ |
| Mixed liquid | | | | | |
| pH | 7 | 3.0 | 9.5 | 8 | 7 |
| Temperature | 30° C. | 30° C. | 10° C. | 30° C. | 30° C. |
| Color tone of coprecipitate | Bright yellow | Light-yellowish white | Light-yellowish white | White | Color of persimmons |
| L | 60.3 | 91 | 95 | 100 | 75.1 |
| A | 0.4 | 0.2 | 0.1 | 0.1 | −1.5 |
| B | 31.0 | 5.3 | 2.1 | −0.2 | 30.7 |
| Color tone of ITO powder | Bright yellow | Olive-green | Olive-green | Olive-green | Bright yellow |
| L | 57.2 | 82.5 | 77.8 | 77.8 | 60.1 |
| A | 2.1 | −7.1 | −7.4 | −8.7 | 0.4 |
| B | 29.7 | 16.3 | 17.8 | 27.9 | 30.8 |
| BET value of ITO powder ($m^2/g$) | 68 | 48 | 45 | 45 | 71 |
| Color tone of ITO powder after modification treatment | Navy blue | Light blue | Light blue | Light blue | Navy blue |
| L | 27.9 | 53.8 | 56.5 | 44.5 | 21.5 |
| A | −3.3 | −4.0 | −5.3 | −3.4 | −2.9 |
| B | −7.8 | −14.1 | −14.3 | −1.0 | −2.7 |
| BET value of ITO powder after modification treatment ($m^2/g$) | 62 | 29 | 27 | 35 | 58 |

(Note)
$SnCl_2$ is $SnCl_2 \cdot 2H_2O$, and a coprecipitate is a coprecipitated indium tin hydroxide.
The color tone of the coprecipitate is a color tone in a dried powder state. The light-yellowish white is slightly-yellowish white.

Example 8

Transparent Conductivity Test

Each of the ITO powder (Example 1) of Sample No. 1 and the ITO powder (Comparative Example 3) of Sample No. 9 was dispersed in a resin; and thereby, dispersed solutions were prepared. Each of the dispersed solutions was applied to a glass plate by spin coating with 150 rpm to form a film. Furthermore, silica sol-gel solution (silica: 1%) was applied to the coated film of the dispersed solution by spin coating with 150 rpm to form a film. Subsequently, the glass plate on which the coated films were formed was calcined at 160° C. for 30 minutes to form a film (the film thickness was 0.2 μm).

A total light transmittance and a surface resistance value of the glass plate on which the film was formed were measured. Measurement results are shown in Tables 2 and 3.

In addition, the surface resistance value was measured by Lorester AP (MCP-T400) manufactured by Mitsubishi Chemical Corporation. A unit "Ω/sq." of a measured value is a unit of sheet resistance, and may be simply referred to as "Ω". The total light transmittance was measured using a measuring device (HGM-3D) manufactured by Suga Test Instruments Co., Ltd. in a visible light range of 400 to 750 nm in compliance with standard (JIS K7150). The measured value of the total light transmittance includes a transmittance of the glass plate (the transmittance of the glass plate is 89.0% and the thickness is 1 mm), and the measured value is a value in the film thickness of 0.2 μm. In Tables 2 and 3, a value (Δ transmittance) that is obtained by subtracting the transmittance (89.0%) of the glass plate from the measured value of the total light transmittance is also shown.

The ITO powder of No. 1 has crystallinity higher than that of the ITO powder of No. 9. Therefore, as shown in Tables 2 and 3, when comparing films under conditions in which the ITO concentrations in the dispersed solutions are the same, each of films (A1 to A7) containing the ITO powder of No. 1 has a lower surface resistance value and a higher total light transmittance than those of films (B1 to B5) containing the ITO powder of No. 9.

Specifically, in the case where the film thickness was 0.2 μm and the concentration of ITO powder was 6 wt %, the surface resistivity was in a range of 20,000 Ω/sq. or less, and the total light transmittance was in a range of 89% or more. In addition, in the case where the film thickness was 0.2 μm and the concentration of ITO powder was in a range of 20 wt %, the surface resistivity was 6,500 Ω/sq. or less, and the total light transmittance was in a range of 85% or more.

By using the ITO powders of this embodiment, a film can be formed which has the above-described characteristics, high transparency, and excellent conductivity.

TABLE 2

|  | A1 | A2 | A3 | A4 | A5 | A6 | A7 |
|---|---|---|---|---|---|---|---|
| Kind of powder | No. 1 | No. 1 | No. 1 | No. 1 | No. 1 | No. 1 | No. 1 |
| ITO concentration in dispersed solution (wt %) | 6 | 8 | 10 | 12 | 15 | 18 | 20 |
| Surface resistance value (Ω/sq.) | 15000 | 11000 | 9400 | 7800 | 7500 | 6400 | 6000 |
| Total light transmittance (%) |  |  |  |  |  |  |  |
| Measured value including glass material | 89.8 | 89.7 | 89.6 | 88.5 | 87.0 | 86.9 | 86.0 |
| Δ transmittance | +0.8 | +0.7 | +0.6 | −0.5 | −2.0 | −2.1 | −3.0 |

(Note)
No. 1 is ITO powder of No. 1 in Table 1.
The film thickness is 0.2 μm.
The transmittance of a glass material is 89.0%, and the thickness of the glass material is 1 mm.
The Δ transmittance is a value obtained by subtracting the transmittance of the glass material from the measured value.

TABLE 3

|  | B1 | B2 | B3 | B4 | B5 |
|---|---|---|---|---|---|
| Kind of powder | No. 9 | No. 9 | No. 9 | No. 9 | No. 9 |
| ITO concentration in dispersed solution (wt %) | 6 | 7 | 8 | 10 | 20 |
| Surface resistance value (Ω/sq.) | 24000 | 21000 | 19000 | 15000 | 9000 |
| Total light transmittance (%) |  |  |  |  |  |
| Measured value including glass material | 89.3 | 88.6 | 88.5 | 88.0 | 76.9 |
| Δ transmittance | +0.3 | −0.4 | −0.5 | −1.0 | −12.1 |

(Note)
No. 9 is ITO powder of No. 9 in Table 1. The film thickness is 0.2 μm.
The transmittance of a glass material is 89.0%, and the thickness of the glass material is 1 mm.
The Δ transmittance is a value obtained by subtracting the transmittance of the glass material from the measured value.

INDUSTRIAL APPLICABILITY

The ITO powders of this embodiment are fine powders in which a specific surface area is in a range of 55 m²/g or more and crystallinity is high. Therefore, by using the ITO powders of this embodiment, a conductive film can be formed which is excellent in transparency and has high conductivity. Therefore, the ITO powders can be appropriately applied to a manufacturing process of functional materials such as a transparent conductive film, an infrared ray shielding film, and the like.

The invention claimed is:

1. An indium tin oxide powder,
   wherein a specific surface area is in a range of 55 m²/g or more, and a color tone is from bright yellow to a color of persimmons, and
   Lab values of the color tone are L: 56.0 to 67.1, a: −1.2 to 2.1, and b: 29.5 to 31.5 in a Lab colorimetric system.

2. The indium tin oxide powder according to claim 1,
   wherein a half-width in the peak of (222) plane is in a range of 0.6° or less on an X-ray diffraction chart.

3. A transparent conductive composition containing the indium tin oxide powder according to claim 1.

4. The transparent conductive composition according to claim 3,
   wherein in the case of forming a film in which a concentration of the indium tin oxide powder is 6 wt % on a glass plate using the transparent conductive composition, a surface resistivity of the film is in a range of 20,000 Ω/sq. or less, and a Δ transmittance obtained by subtracting a transmittance of the glass plate from a total light transmittance is in a range of 2% or less, and
   in the case of forming a film in which a concentration of the indium tin oxide powder is 20 wt % on a glass plate using the transparent conductive composition, a surface resistivity of the film is in a range of 6,500 Ω/sq. or less, and a Δ transmittance obtained by subtracting a transmittance of the glass plate from a total light transmittance is in a range of 5% or less.

5. A method for producing an indium tin oxide powder, the method comprising:
   a process of coprecipitating an indium tin hydroxide by using a tin ($Sn^{2+}$) compound under conditions in which pH is 4.0 to 9.3, and a temperature of a liquid is in a range of 5° C. or higher, wherein the indium tin hydroxide has a color tone from bright yellow to a color of persimmons in a dried powder state; and
   a process of drying and calcining the indium tin hydroxide, and
   wherein in the process of drying and calcining the indium tin hydroxide, the indium tin hydroxide is heated and calcined under either one of an air atmosphere, a nitrogen atmosphere containing alcohol, or a nitrogen atmosphere containing ammonia.

6. The method for producing an indium tin oxide powder according to claim 5,
   wherein in the process of coprecipitating the indium tin hydroxide, the indium tin hydroxide is coprecipitated by dripping a mixed aqueous solution of indium trichloride and tin dichloride and an aqueous alkali solution to water at the same time or by dripping the mixed aqueous solution to the aqueous alkali solution.

7. The method for producing an indium tin oxide powder according to claim 5,
wherein in the process of drying and calcining the indium tin hydroxide, the indium tin hydroxide is heated and calcined at the same time as the drying or after the drying under the nitrogen atmosphere containing alcohol or the nitrogen atmosphere containing ammonia so as to produce the indium tin oxide powder in which a surface is modified, a specific surface area is in a range of 40 m$^2$/g or more, and a color tone is navy blue.

8. A transparent conductive composition containing the indium tin oxide powder according to claim 2.

9. The transparent conductive composition according to claim 8,
wherein in the case of forming a film in which a concentration of the indium tin oxide powder is 6 wt % on a glass plate using the transparent conductive composition, a surface resistivity of the film is in a range of 20,000 Ω/sq. or less, and a Δ transmittance obtained by subtracting a transmittance of the glass plate from a total light transmittance is in a range of 2% or less, and
in the case of forming a film in which a concentration of the indium tin oxide powder is 20 wt % on a glass plate using the transparent conductive composition, a surface resistivity of the film is in a range of 6,500 Ω/sq. or less, and a Δ transmittance obtained by subtracting a transmittance of the glass plate from a total light transmittance is in a range of 5% or less.

10. The method for producing an indium tin oxide powder according to claim 6,
wherein in the process of drying and calcining the indium tin hydroxide, the indium tin hydroxide is heated and calcined at the same time as the drying or after the drying under the nitrogen atmosphere containing alcohol or the nitrogen atmosphere containing ammonia so as to produce the indium tin oxide powder in which a surface is modified, a specific surface area is in a range of 40 m$^2$/g or more, and a color tone is navy blue.

* * * * *